(No Model.) 2 Sheets—Sheet 1.
V. KROTZINGER.
FOLDING WAGON.
No. 561,796. Patented June 9, 1896.
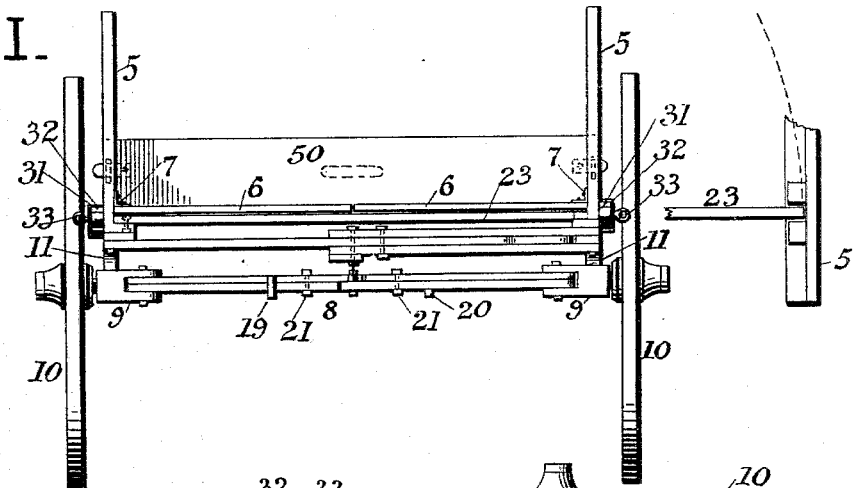
Fig I.
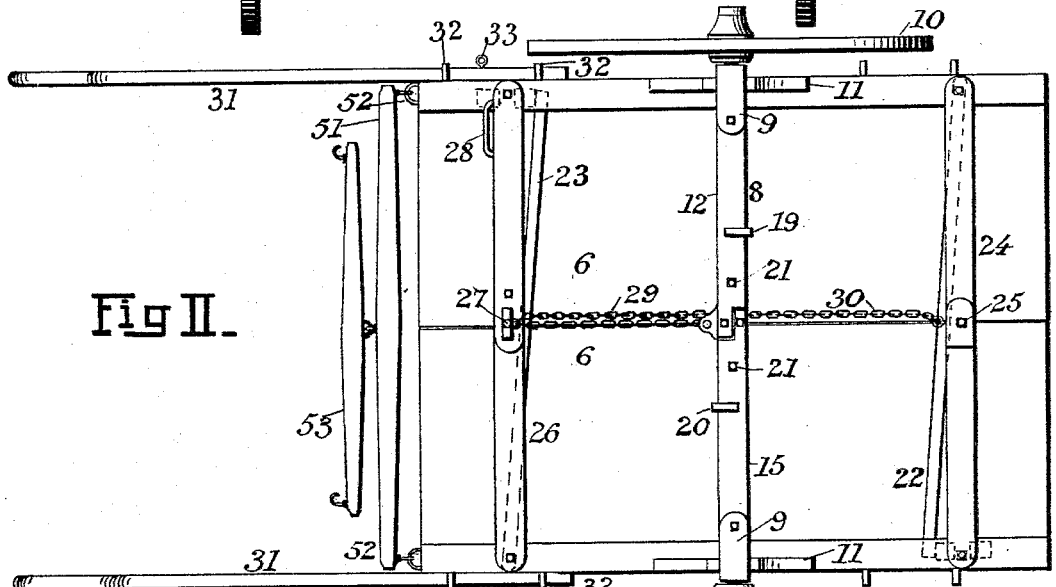
Fig II.
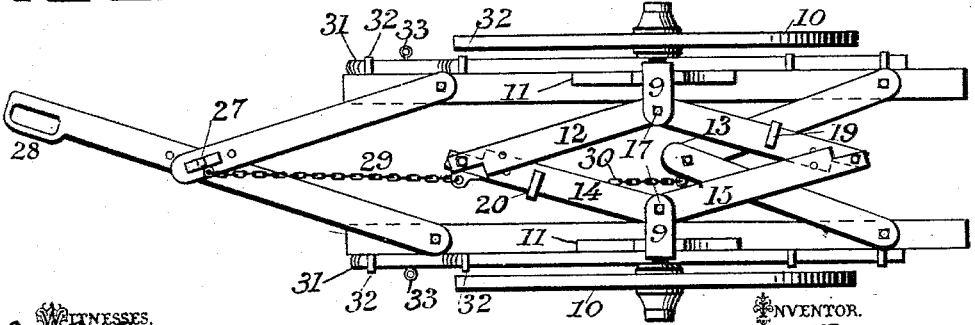
Fig III.
Witnesses:
J. S. Bowen
M. C. Hillyard
Inventor:
Victor Krotzinger,
by W. R. Stevens, Atty.

(No Model.) 2 Sheets—Sheet 2.
V. KROTZINGER.
FOLDING WAGON.
No. 561,796. Patented June 9, 1896.
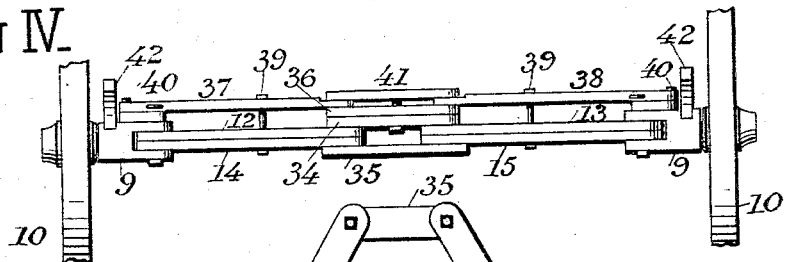
Fig IV.
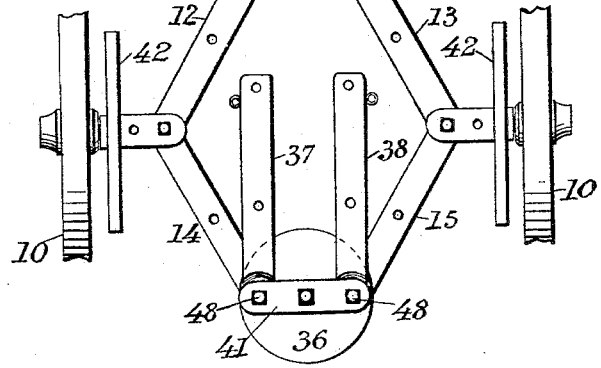
Fig V.
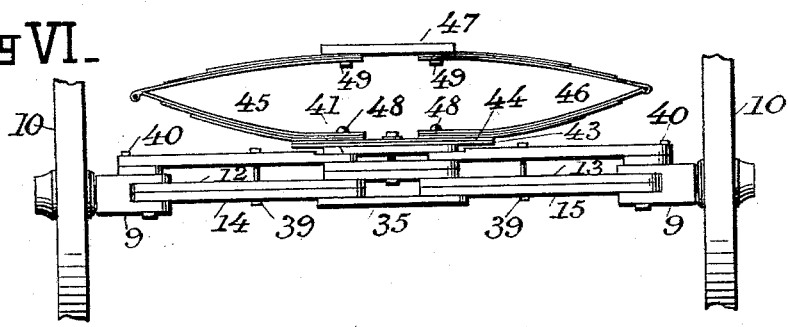
Fig VI.
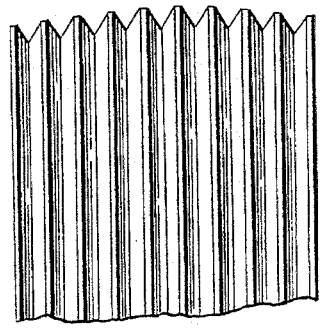
Fig VII.
WITNESSES,
J. S. Bowen
M. C. Hillyard
INVENTOR.
Victor Krotzinger
by W. E. Stevens ATTY.

UNITED STATES PATENT OFFICE.

VICTOR KROTZINGER, OF NEW YORK, N. Y.

FOLDING WAGON.

SPECIFICATION forming part of Letters Patent No. 561,796, dated June 9, 1896.

Application filed March 6, 1896. Serial No. 582,037. (No model.)

*To all whom it may concern:*

Be it known that I, VICTOR KROTZINGER, a citizen of France, (having declared my intention of becoming a citizen of the United States,) residing at New York, in the county of New York and State of New York, have invented a new and useful Improvement in Folding Wagons; and I do hereby declare the following to be a full, clear, and exact description of the same, reference being had to the accompanying drawings, in which—

Figure I is a front-end view of a hand-cart according to my invention. Fig. II is an under-side view of the same cart in its normal condition. Fig. III is an under-side view of the cart folded. Fig. IV is a front-side view of the rear axle of a wagon or carriage. Fig. V is a top view of the axle shown in Fig. IV. Fig. VI is a front view of the forward axle of a wagon or carriage. Fig. VII is a detail view showing means for folding the top and rear end of wagon-covers.

This invention relates in general to carriages, wagons, and other vehicles having two wheels on the same axle and one or more axles; and its object is to provide means for folding the body of the carriage into more compact space transversely for the purpose of economical storage in cities, or in transportation on cars or on shipboard, or under any circumstances when the saving of space is a consideration.

To this end my invention consists in the construction and combination of parts forming a wagon, hereinafter described and claimed.

For the purposes of the present application the principal part of the description has reference to a hand-cart, in which 5 represents the side-boards of the cart; 6, the bottom parted longitudinally midway and hinged to the sides at 7, so that the two halves of the bottom may be folded upward against the sides.

8 represents the axle, comprising the two arms 9, upon which the wheels 10 are journaled. On these arms pillows 11 are rigidly secured as close to the hub of the wheel as practicable, and upon these pillows the sides 5 are rigidly fixed. In such carriages or wagons as require springs a spring may be substituted for each of these pillows, the axle 8 representing the rear axle of the carriage. In connection with the two arms 9 the axle further comprises in its body four separable members 12 13 14 15. The pair 12 and 13 are hinged to the arm and to each other at 17. The upper member 12 of one pair is hinged midway of the axle to the lower member 14 of the other pair, and the lower member 13 of the one pair is hinged midway of the axle to the upper member 15 of the other pair, and in order to bring these hinges in the central vertical plane of the body the hinge portions lap one past the other in the central transverse vertical plane of the axle.

19 represents a clamping-finger secured to the member 13 and lapping beneath its mate 12, but not fastened to the latter, to serve as a stiffener when the parts are normally folded, and 20 represents a similar clamping-finger secured to the member 14 and passing under its mate 15.

21 represents pins passing vertically through the two members of each pair to secure them rigidly together with the axle in its normal condition.

22 represents a cross-bar pivoted to one of the sides of the cart and adapted to extend across the cart beneath the rear portion of the bottom boards 6 as an immediate support therefor, and 23 is a similar cross-bar pivoted to the opposite side as a support for the forward portion of the bottom boards. The free end of each of these cross-bars enters a notch in the cart side opposite to its hinge to steady it in service, and it may be raised out of the notch and swung, as shown in dotted lines, to fold along the side to which it is pivoted.

24 represents another cross-bar beneath the bar 22, pivoted at both ends to the respective sides of the cart, the midway portion being parted and pivoted together at 25.

26 is a cross-bar pivoted at its end to the side beneath the cross-bar 23, comprising two members and jointed midway by a pivot 27, one member extending across beneath the other and provided with a loop 28 to serve as a handle.

29 is a chain connecting the midway portion of the bar 26 with two members 12 and 14 of the axle, and 30 is a chain connecting the bar 26 with the midway portion of the cross-bar 24.

31 represents the cart-handles, each of which passes through a pair of staples 32 at the sides of the cart and is provided with a pin 33 to secure it in its normal position longitudinally.

In the operation of folding this wagon the pins 33 are first to be withdrawn and the handles 31 to be slid longitudinally backward through the staples 32. Then the bottom boards 6 are to be folded up against their sides on the hinges 7. Then the cross-bars 22 and 23 are to be folded to their respective sides. Now if the operator takes hold of the handle 28 and pulls it forward the cross-bar 26, the forward members 12 14 of the axle, and the rear cross-bar 24 will be bent forward midway, while the rear members 13 15 of the axle, having their central pivot a little to the rear of a line drawn through their side pivots, will be forced to bend backward until their parts will be folded together, as shown in Fig. III, and the cart will be folded in compact form for storage or transportation.

In carrying out my ideas on four-wheeled vehicles I may add intermediate pieces 34 and 35, connecting, respectively, the members 12 and 14, and 13 with 15, the part 34 being a small circular plate and the part 35 being a simple straight bar. On top of the plate 34 is located a mate-plate 36, centrally pivoted thereto, and upon this plate near its edges are pivoted two members 37 and 38, which normally extend along the axle, each member being provided with two pin-holes, through which pins 39 and 40 may pass to connect this upper member with the lower members of the axle, the pins 40 passing through the arms 9, upon which the wheels are journaled.

41 represents a strengthener for the plate 36 and may be made separate therefrom or integral therewith; but in either case it is located above the members 37 and 38, the pivots 48 passing through it and then through the members into the plate.

42 represents side springs or pillows for supporting springs, according to the construction of the rear axle and its connection with the carriage.

43 represents the lower plate of the fifth-wheel located on top of the plate 41, and 44 is the mate or rotary plate of the fifth-wheel located on top of the plate 43 to revolve thereon.

45 and 46 represent the two portions of a carriage-spring, and 47 is a connecting member for these two parts. The ends of each spring are connected with the plate 44 by pivots 48 and with the member 47 by pivots 49, directly over pivots 48.

It will be understood that the springs swing upon these pivots 48 and 49 in a manner corresponding with the movement of the members 37 and 38, as shown in Fig. V, and that the action of all these parts is similar to that described heretofore relative to the cart-axle, so that all these portions of the running-gear which occupy transverse positions beneath the wagon or carriage body are pivoted to fold up in order to permit the sides of the wagon to be brought as near together as practicable. In carrying out this idea the top and rear end of the wagon-cover may be arranged to fold up like a bellows, as shown in Fig. VII.

It will be understood that the seats of the wagon are usually made removable and that they may be placed lengthwise of the wagon when the latter is folded. When the bottom is closed down in place, a hind-board 50 may be pushed in between the sides over the bottom to assist in keeping the parts rigid.

51 represents a crosstree hooked to the sides at 52, and 53 a singletree on crosstree for the attachment of a horse.

It will be understood that thills for the attachment of a horse may be connected with the body like the handles 31. It may thus be seen that I have made provision for storing all the parts of a wagon in very much less space than the same would occupy in its normal condition.

Having thus described my invention, what I believe to be new, and desire to secure by Letters Patent, is the following:

1. The combination of a longitudinally-parted wagon-body; wheel-axle arms secured to the side portions of the body; and the separable members 12, 13, 14 and 15 hinged together and to the two arms of each axle, substantially as described.

2. The combination of two arms of a wagon-axle; the upper member 12 of one side hinged to the lower member 14 of the other side as one pair, and the lower member 13 of the one side hinged to the lower member 15 of the other side as the other pair; the hinge of one pair lapping past the hinge of the other pair in the central transverse vertical plane; and a clamping-finger secured to each upper member and passing beneath the lower member of the same side, substantially as described.

3. The combination of transverse members of wagon-gear parted and pivoted to fold transversely; a fifth-wheel mounted on certain of said cross members and a spring in two parts pivoted at their adjacent ends to the turning member of the fifth-wheel, substantially as described.

In testimony whereof I affix my signature in presence of two witnesses.

VICTOR KROTZINGER.

Witnesses:
BERTIN TOULOTTE,
JULES KROTZINGER.